(12) United States Patent
Gibbs

(10) Patent No.: US 11,684,217 B2
(45) Date of Patent: Jun. 27, 2023

(54) ARTICULATING FOOD UTENSIL

(71) Applicant: Jered Leshan Gibbs, Porterville, MS (US)

(72) Inventor: Jered Leshan Gibbs, Porterville, MS (US)

(*) Notice: Subject to any disclaimer, the term of this patent is extended or adjusted under 35 U.S.C. 154(b) by 121 days.

(21) Appl. No.: 17/368,045

(22) Filed: Jul. 6, 2021

(65) Prior Publication Data
US 2022/0218156 A1 Jul. 14, 2022

Related U.S. Application Data

(60) Provisional application No. 63/205,790, filed on Jan. 8, 2021.

(51) Int. Cl.
*A47J 43/28* (2006.01)

(52) U.S. Cl.
CPC .................................. *A47J 43/288* (2013.01)

(58) Field of Classification Search
CPC ...... A47J 43/288; A47J 43/283; A47J 43/281; A47J 43/1087
USPC ...................................................... 294/7, 131
See application file for complete search history.

(56) References Cited

U.S. PATENT DOCUMENTS

| | | | |
|---|---|---|---|
| 304,909 A | | 9/1884 | Coleman |
| 1,362,031 A | * | 12/1920 | Nopp ..................... A47J 43/288 30/136 |
| 1,803,006 A | * | 4/1931 | Davis .................... A47J 43/283 294/7 |
| 2,156,014 A | | 4/1939 | Greene et al. |
| 2,226,794 A | * | 12/1940 | Williams ................. B26B 5/006 30/169 |
| 2,485,521 A | * | 10/1949 | Wendt ................... A47J 43/288 294/7 |
| 2,589,753 A | * | 3/1952 | Vinson ................... A47L 13/08 30/340 |

(Continued)

FOREIGN PATENT DOCUMENTS

KR 1020180031504 A 3/2018

OTHER PUBLICATIONS

PCT International Searching Authority/U.S. International Search Report, dated Mar. 25, 2022, for PCT/US2022/011380, "Articulating Food Utensil".

(Continued)

*Primary Examiner* — Paul T Chin
(74) *Attorney, Agent, or Firm* — Jones Walker LLP

(57) ABSTRACT

An articulating food utensil includes a handle and an articulating blade secured to a distal portion of the handle, with the articulating blade configured to rotate or pivot about a pivot axle relative to the handle. The utensil includes a lock assembly configured to selectively retain a rotational position of the articulating blade relative to the handle. The lock assembly may include a lock protuberance configured to engage one of multiple lock receptacles in a proximal portion of the articulating blade. The lock protuberance is disposed on the distal portion of the handle. Each of the lock receptacles may include a hole through the articulating blade or a concavity in a lower surface of the articulating blade. The pivot axle may include a pivot pin disposed in a pivot receptacle in the proximal portion of the articulating blade. The pivot pin is secured to the distal end of the handle.

19 Claims, 6 Drawing Sheets

(56) References Cited

U.S. PATENT DOCUMENTS

| | | | | |
|---|---|---|---|---|
| 3,224,091 | A * | 12/1965 | Scigliano | A47J 43/281 |
| | | | | D32/42 |
| 3,730,579 | A * | 5/1973 | Mock | A47J 43/288 |
| | | | | D7/688 |
| 4,817,229 | A | 4/1989 | Sedillo | |
| 5,104,166 | A * | 4/1992 | Corsaro | A47J 43/283 |
| | | | | 294/8 |
| 5,440,811 | A * | 8/1995 | Challis | B25G 3/26 |
| | | | | 30/169 |
| D411,080 | S * | 6/1999 | Santini | 30/142 |
| 7,380,848 | B2 * | 6/2008 | Petruzelli | E01H 5/02 |
| | | | | 294/54.5 |
| 7,607,706 | B2 | 10/2009 | Cunningham et al. | |
| 9,993,115 | B2 | 6/2018 | Westmoreland | |
| 2004/0040108 | A1 * | 3/2004 | Kaminstein | A46B 7/06 |
| | | | | 15/144.1 |
| 2004/0064952 | A1 | 4/2004 | Armienta | |
| 2004/0232712 | A1 | 11/2004 | Siegel et al. | |
| 2011/0200729 | A1 | 8/2011 | Caswell | |

OTHER PUBLICATIONS

PCT International Searching Authority/U.S. Written Opinion of the International Searching Authority, dated Mar. 25, 2022, for PCT/US2022/011380, "Articulating Food Utensil".

* cited by examiner

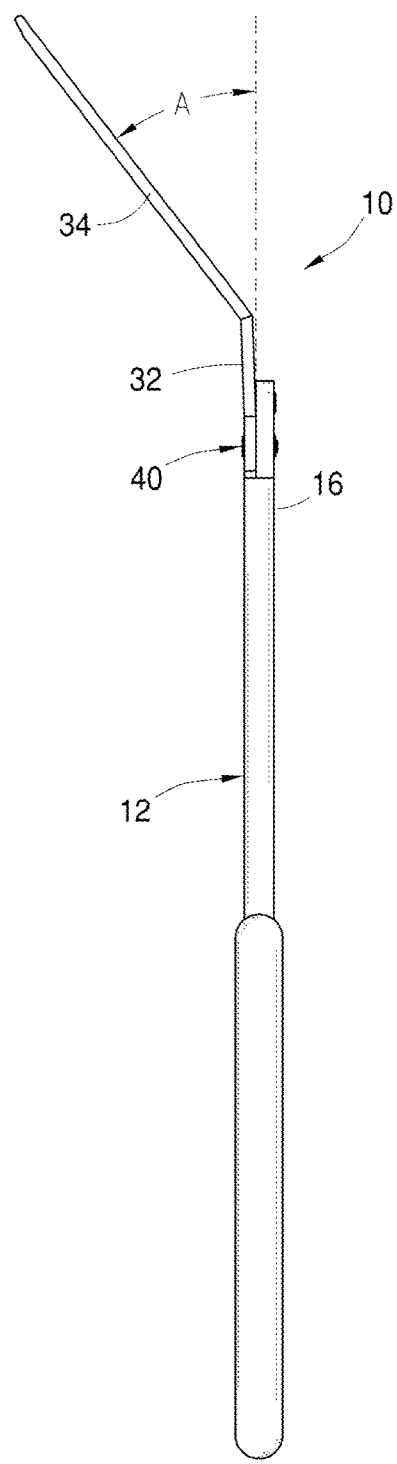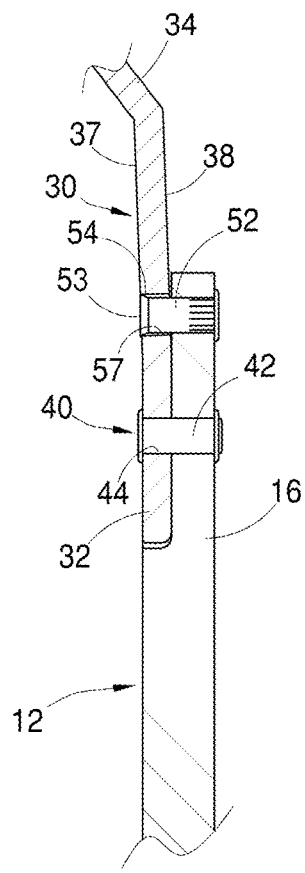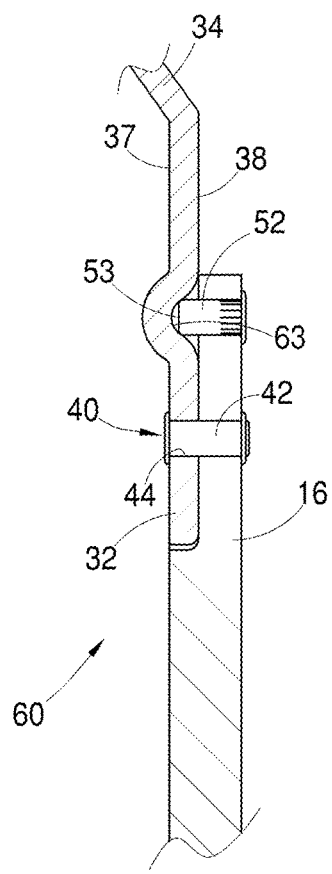
Fig. 3
Fig. 4
Fig. 10

ARTICULATING FOOD UTENSIL

CROSS-REFERENCE TO RELATED APPLICATION

The application claims the benefit of and priority to U.S. Provisional Patent Application No. 63/205,790 filed on Jan. 8, 2021, which is incorporated herein by reference in its entirety.

BACKGROUND

Certain food utensils, such as food turners and spatulas, are long handled utensils that aid in the cooking process by allowing the user to apply a safer method of turning or flipping a food item without suffering bodily injury, such as burns, to fingers and hands. Conventional food turners are typically made of thin sheet metal, such as stainless steel, which provides the requisite stiffness while being sufficiently thin enough to be inserted between a cooking surface and the food item being cooked thereon. Basic food turners have two components: a handle and a blade. The blade is usually flat with a square or rectangular shape. Some food turners include a shaft interconnecting the blade and the handle. The shaft may be flat or round. The blade is fixed to the handle and/or the shaft in a generally aligned position.

Because of their fixed in-line design, conventional food turners can only be inserted between the food item and the cooking surface at limited angles, thereby requiring a greater range of motion with the user's hands and wrists to accomplish the flipping and/or turning process. The repetitive nature of the food flipping and turning process, particularly in commercial or industrial food preparation settings, can place users at a greater risk of developing joint ailments or injuries such as carpal tunnel syndrome.

There is a need for an ergonomic food utensil that reduces the risk of injury and allows for more effective turning and flipping of food items during the cooking process.

SUMMARY

According to one aspect of the present invention, an articulating food utensil includes a handle, an articulating blade attached to a distal end of the handle at a pivot axle, and a lock assembly configured to selectively retain the articulating blade in a desired rotational position relative to the handle. The articulating blade is configured to selectively twist, swivel, rotate, or oscillate from right to left relative to the handle for dexterity purposes of the user. The pivot axle may be formed of a pivot receptacle in a proximal portion of the articulating blade and a pivot pin engaging the handle and the pivot receptacle of the articulating blade. The lock assembly includes a lock protuberance configured to engage one of multiple lock receptacles in the proximal portion of the articulating blade. The lock protuberance extends from the distal end of the handle. The lock receptacles may be formed of holes extending through the articulating blade. Alternatively, the lock receptacles may be formed of concavities in a lower surface of the articulating blade.

Because of its ergonomic and adjustable design, the articulating food utensil is more effective in the food turning process and minimizes the risk of injury to the user.

BRIEF DESCRIPTION OF THE DRAWING VIEWS

Preferred features, embodiments and variations of the invention may be discerned from the following detailed description which provides sufficient information for those skilled in the art to perform the invention. The detailed description is not to be regarded as limiting the scope of the preceding summary of the invention in any way. The detailed description will make reference to a number of drawings as follows:

FIG. 3 is a side view of the articulating food utensil.

FIG. 4 is a cross-sectional view of the articulating food utensil taken along line 4-4 in FIG. 5.

FIG. 10 is a cross-sectional view of the articulating food utensil shown in FIG. 8, taken along line 10-10 in FIG. 11.

DETAILED DESCRIPTION OF SELECTED EMBODIMENTS

Figure 1:
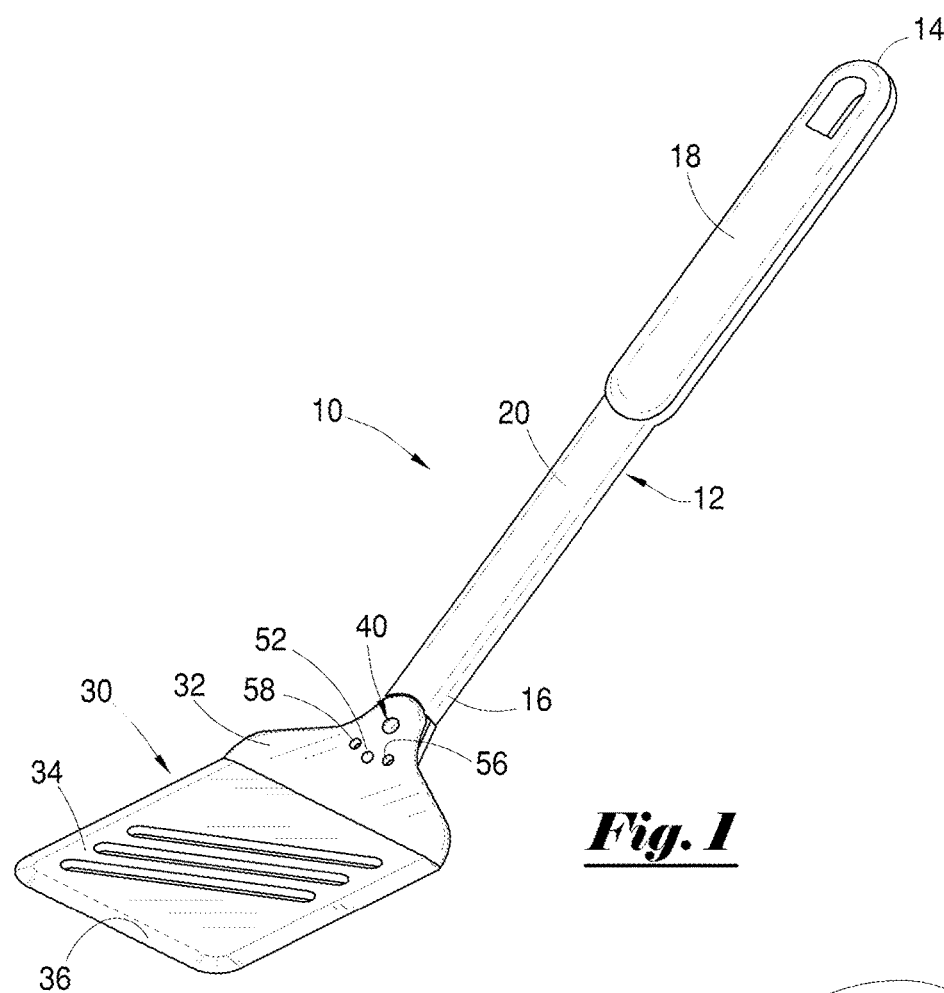
FIG. 1 is a perspective view of an articulating food utensil.
Figure 2:
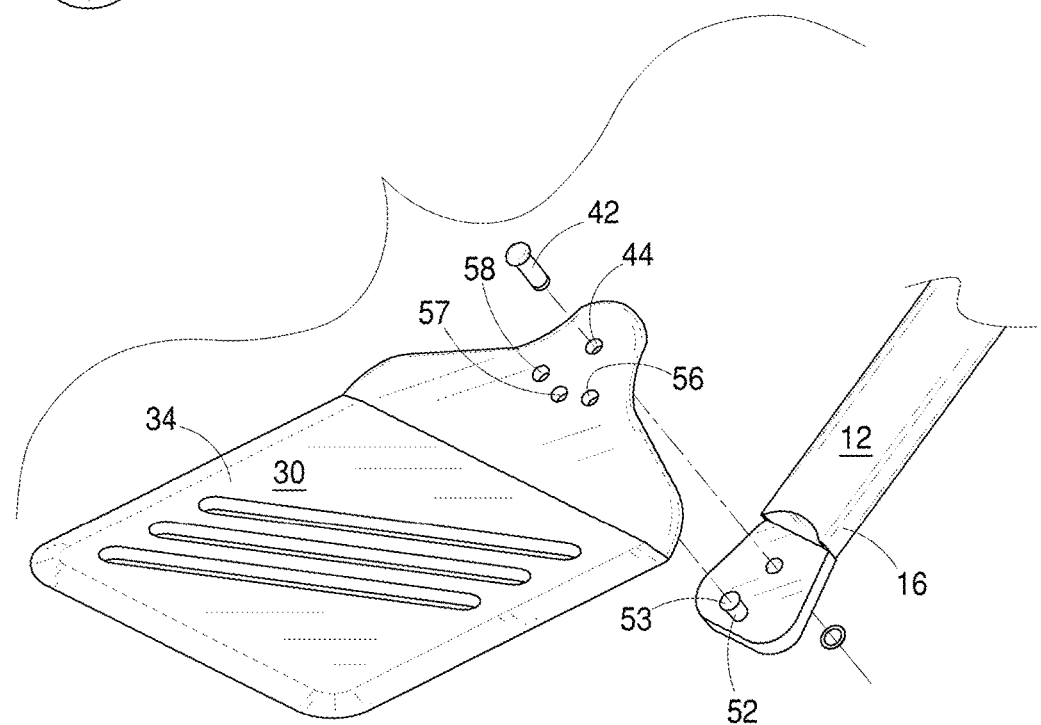
FIG. 2 is a partial exploded view of the articulating food utensil.

FIGS. 1 and 2 illustrate an embodiment of an articulating food utensil. The illustrated embodiments are illustrative only. Articulating food utensil 10 includes an articulating blade 30 connected to a handle 12 at pivot axle 40. Handle 12 may define a utensil axis. Proximal portion 14 of handle 12 includes a holding portion 18 and distal portion 16 of handle 12 includes a shaft 20. Holding portion 18 and shaft 20 may each be formed of wood, plastic, rubber, nylon, metal, or any other synthetic or natural material. In one embodiment, holding portion 18 and shaft 20 are separately formed and attached to one another. For example, holding portion 18 may be formed of wood, and shaft 20 may be formed of plastic. In an alternate embodiment, holding portion 18 and shaft 20 are integrally formed of the same material, such as wood, plastic, rubber, nylon, or metal.

Articulating blade 30 is configured to engage food items, such as those exposed to heated surfaces for cooking. Articulating blade 30 includes proximal portion 32 and distal portion 34. Distal portion 34 may have any shape, such as a generally rectangular shape or generally square shape. In some embodiments, distal portion 34 is flat with chamfered edges 36. Articulating blade 30 may be formed of metal, nylon, wood, plastic, or rubber.

With reference to FIG. 3, distal portion 34 of articulating blade 30 may extend from proximal portion 32 at angle A. Angle A may be between 0 degrees and 90 degrees. Alternately, distal portion 34 may extend from proximal portion 32 in the same plane; i.e., angle A may be 0 degrees.

Referring to FIGS. 1-4, proximal portion 32 of articulating blade 30 includes pivot receptacle 44 and lock receptacles 56, 57, and 58. Pivot receptacle 44 may be positioned in a central area of proximal portion 32 of articulating blade 30. Lock receptacles 56-58 may be arranged in a range of positions that are equidistance from pivot receptacle 44. In one embodiment, lock receptacles 56-58 are positioned in a fan-shaped pattern around pivot receptacle 44. Proximal portion 32 may include between 2 and 20 lock receptacles, or any subrange therein. In the illustrated embodiment, proximal portion 32 includes 3 lock receptacles 56, 57, and 58.

Pivot axle 40 may pivotally secure articulating blade 30 to distal portion 16 of handle 12. In the illustrated embodiment, pivot axle 40 is defined by pivot pin 42 and pivot receptacle 44. Pivot pin 42 may be secured to distal portion 16 of handle 12. Pivot pin 42 may be formed of a pin, post, rivet, screw, bolt, or any other device configured to allow rotation of the adjacent components. Pivot pin 42 may be disposed through and engage pivot receptacle 44 to secure articulating blade 30 to distal portion 16 of handle 12 in a configuration that facilitates the rotation or pivoting of articulating blade 30 relative to handle 12. In one embodiment, articulating blade 30 is configured to rotate up to 360 degrees about pivot axle 40 relative to handle 12. Preferably, articulating blade 30 is configured to rotate between 1 degree and 180 degrees, or any subrange therein, in both directions from an axis formed by handle 12. More preferably, the angle of rotation of articulating blade 30 is between 1 degree and 135 degrees, or any subrange therein, in both directions from the axis formed by handle 12. Still more preferably, the angle of rotation of articulating blade 30 is between 1 degree and 90 degrees, or any subrange therein, in both directions from the axis formed by handle 12.

The rotational position of articulating blade 30 relative to handle 12 is selectively set by a lock assembly. The lock assembly includes lock receptacles 56-58 in articulating blade 30 and a lock protuberance 52 secured to distal portion 16 of handle 12. Lock protuberance 52 engages one of the lock receptacles 56-58 to selectively lock the rotational position of articulating blade 30 relative to handle 12. In one embodiment, lock protuberance 52 is integrally formed with distal portion 16 of handle 12. In some embodiments, lock protuberance 52 may be positioned beyond pivot pin 42 on distal portion 16 of handle 12.

In one embodiment, each lock receptacle 56, 57, and 58 may be defined by a hole through proximal portion 32 of articulating blade 30 as illustrated in FIGS. 1-4. In this embodiment, lock protuberance 52 engages one of the lock receptacles 56-58 to lock articulating blade 30 in a rotational position relative to handle 12. Lock protuberance 52 may engage a side wall of one of the lock receptacles 56-58 or the top 53 of lock protuberance 52 may extend beyond top surface 37 of articulating blade 30. In one embodiment, lock protuberance 52 may have a flared profile 54 for further engaging lock receptacles 56-58.

Figure 7:
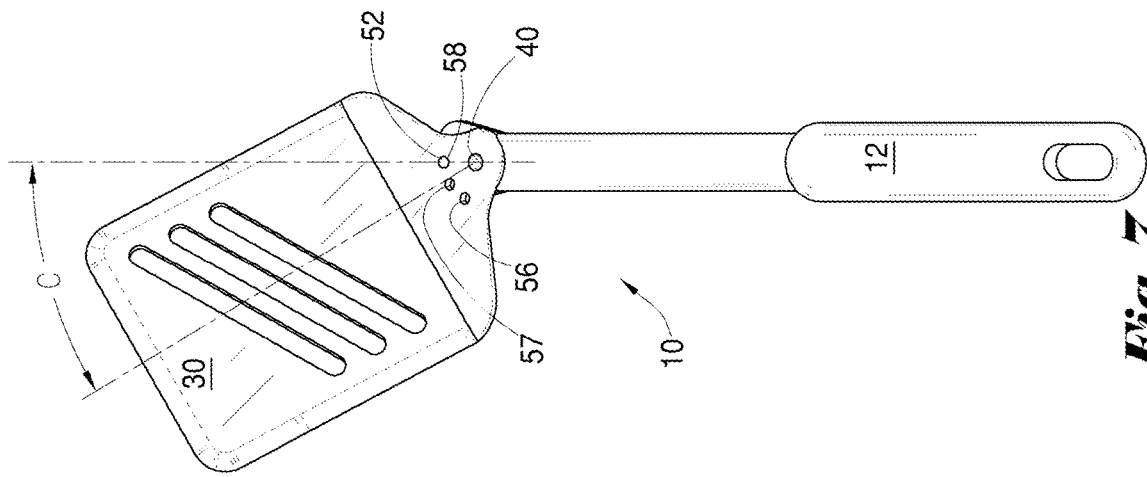
FIG. 7 is a top view of the articulating food utensil with the articulating blade in a third position.
Figure 6:
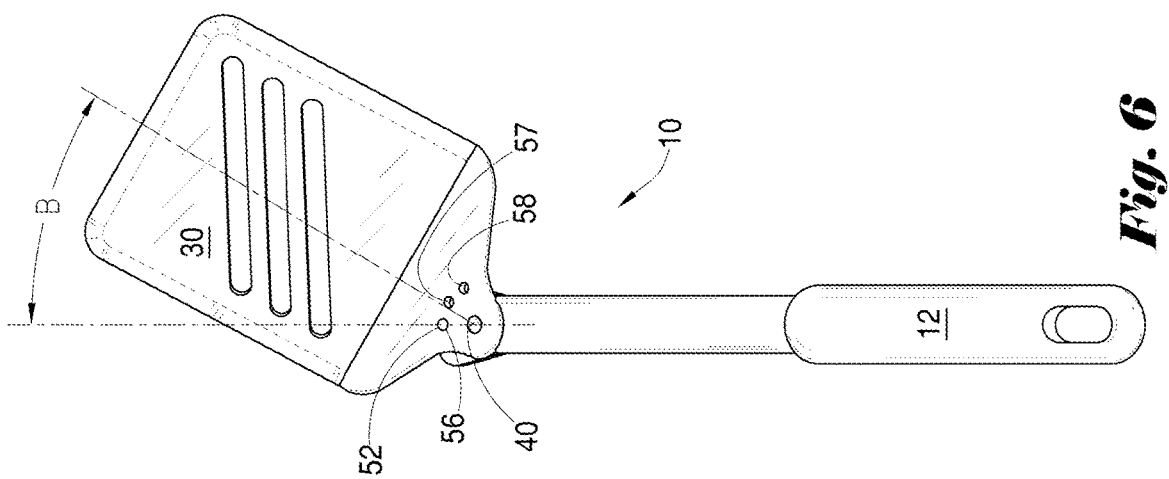
FIG. 6 is a top view of the articulating food utensil with the articulating blade in a second position.
Figure 5:
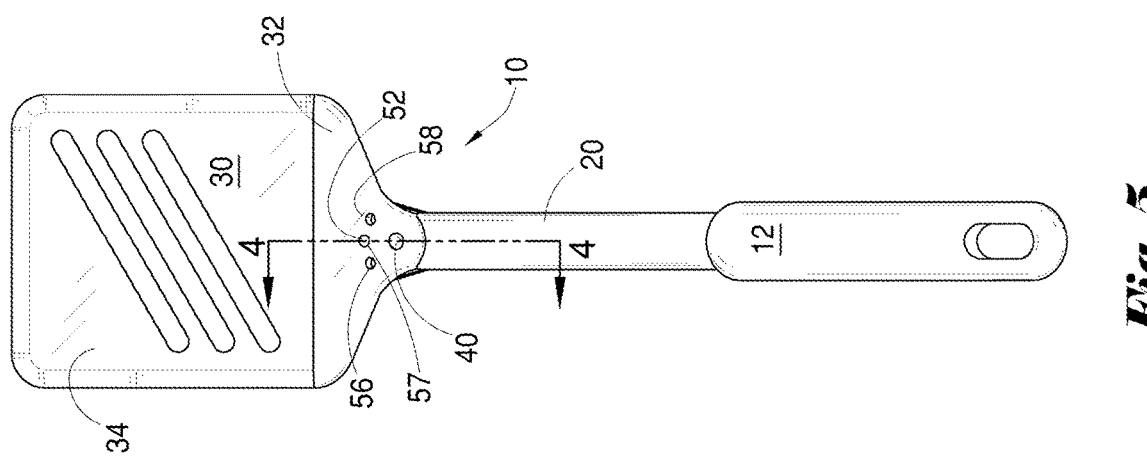
FIG. 5 is a top view of the articulating food utensil with an articulating blade in a first position.

FIGS. 5-7 illustrate the selective adjustment of the rotational position of articulating blade 30. The process of adjusting the position of articulating blade 30 may include disengaging lock protuberance 52 from a first lock receptacle 56-58, rotating articulating blade 30 relative to handle 12 about pivot axle 40, and engaging a second lock receptacle 56-58 with lock protuberance 52 to secure articulating blade 30 in the new position.

To adjust articulating blade 30 from a first position shown in FIG. 5 to a second position shown in FIG. 6, lock protuberance 52 may be disengaged from the first lock receptacle 57 by applying an upward force on distal portion 34 or proximal portion 32 of articulating blade 30 to further separate articulating blade 30 from shaft 20. Specifically, proximal portion 32 of articulating blade 30 may be lifted to place lower surface 38 of articulating blade 30 (shown in FIGS. 3-4) above top 53 of lock protuberance 52, thereby allowing articulating blade 30 to rotate about pivot axle 40. Articulating blade 30 may then be rotated into the second position shown in FIG. 6 in which lock protuberance 52 is aligned with lock receptacle 56. The upward force may then be removed from articulating blade 30 in order to engage lock receptacle 56 with lock protuberance 52 by positioning lower surface 38 of articulating blade 30 below top 53 of lock protuberance 52. In this way, the lock assembly may selectively secure articulating blade 30 in the second position shown in FIG. 6, in which articulating blade 30 is rotated by angle B to the right of the axis formed by handle 12.

Similarly, articulating blade 30 may be placed into the third position shown in FIG. 7 by applying an upward force on articulating blade 30 to lift lower surface 38 of articulating blade 30 above top 53 of lock protuberance 52, thereby disengaging lock protuberance 52 from lock receptacle 56. Articulating blade 30 may then be rotated into the third position shown in FIG. 7 in which lock protuberance 52 is aligned with lock receptacle 58. The upward force may then be removed from articulating blade 30 in order to engage lock receptacle 58 with lock protuberance 52 by positioning lower surface 38 of articulating blade 30 below top 53 of lock protuberance 52. In this way, the lock assembly may selectively secure articulating blade 30 in the third position shown in FIG. 7, in which articulating blade 30 is rotated by angle C to the left of the axis formed by handle 12.

Figure 8:
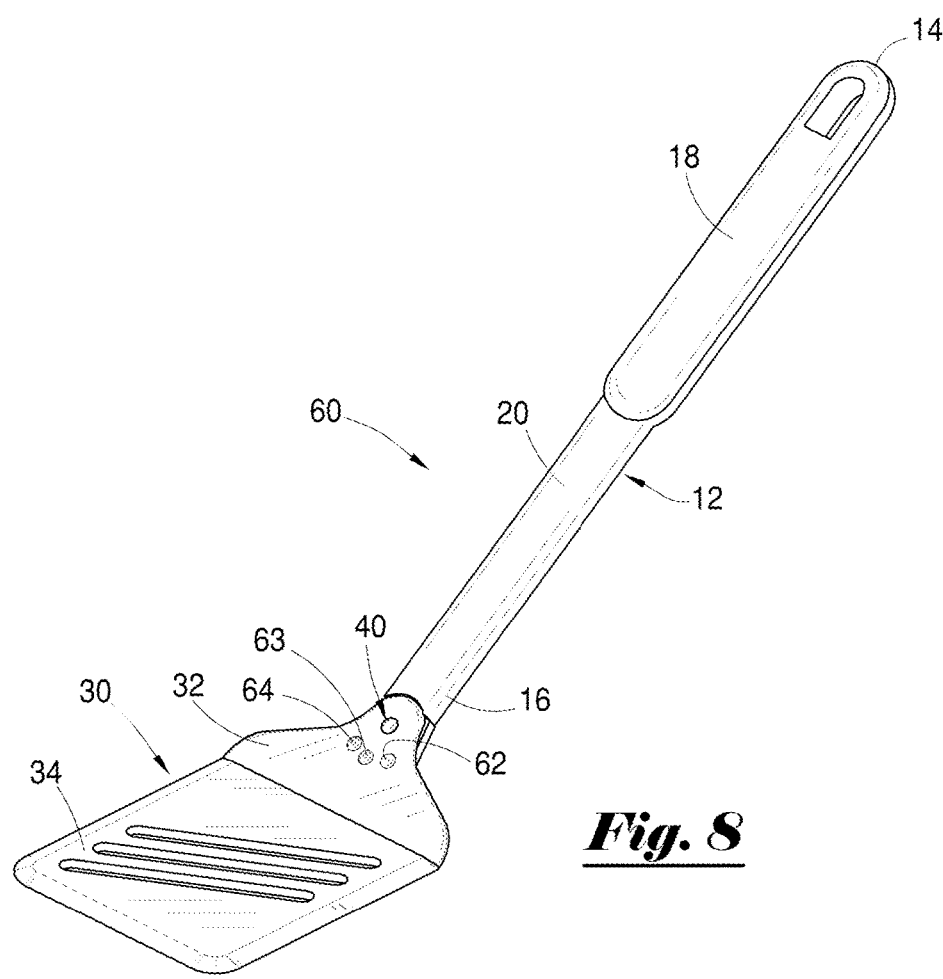
FIG. 8 is a top view of an alternate embodiment of the articulating food utensil.
Figure 9:
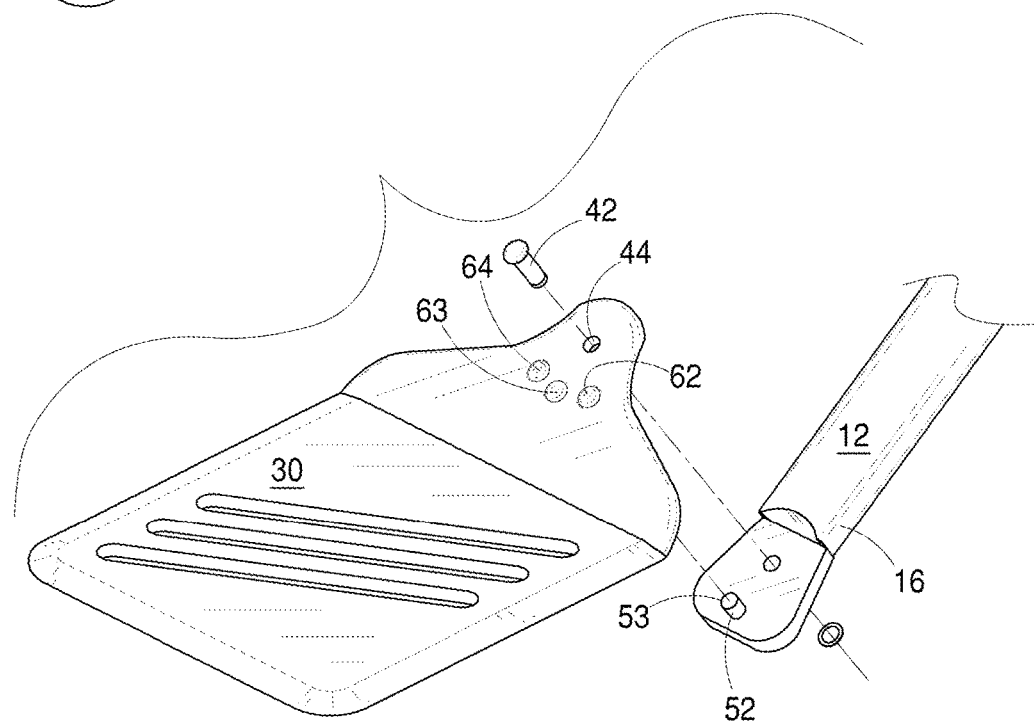
FIG. 9 is a partial exploded view of the articulating food utensil shown in FIG. 8.

Referring now to FIGS. 8-10, articulating food utensil 60 includes an alternate lock assembly. The lock assembly of articulating food utensil 60 may include lock receptacles 62, 63, and 64 that are formed by concavities (e.g., bubbles, dimples, or recesses) in lower surface 38 of articulating blade 30. The concavities are configured to engage top 53 of lock protuberance 52 to secure the rotational position of articulating blade 30. In this embodiment, top 53 of lock protuberance 52 remains behind lower surface 38 of articulating blade 30 in all rotational positions. The top surface 37 of articulating blade 30 above lock receptacles 62-64 may be curved or flat. Lock receptacles 62-64 may be arranged in a range of positions that are equidistance from pivot receptacle 44 on proximal portion 32 of articulating blade 30. For example, lock receptacles 62-64 may be positioned in a fan-shaped pattern around pivot axle 40. Proximal portion 32 may include between 2 and 20 lock receptacles, or any subrange therein. In the illustrated embodiment, proximal portion 32 includes 3 lock receptacles 62, 63, and 64. Except as otherwise described, articulating food utensil 60 includes the same features and characteristics shown and described in connection with articulating food utensil 10.

Figure 13:
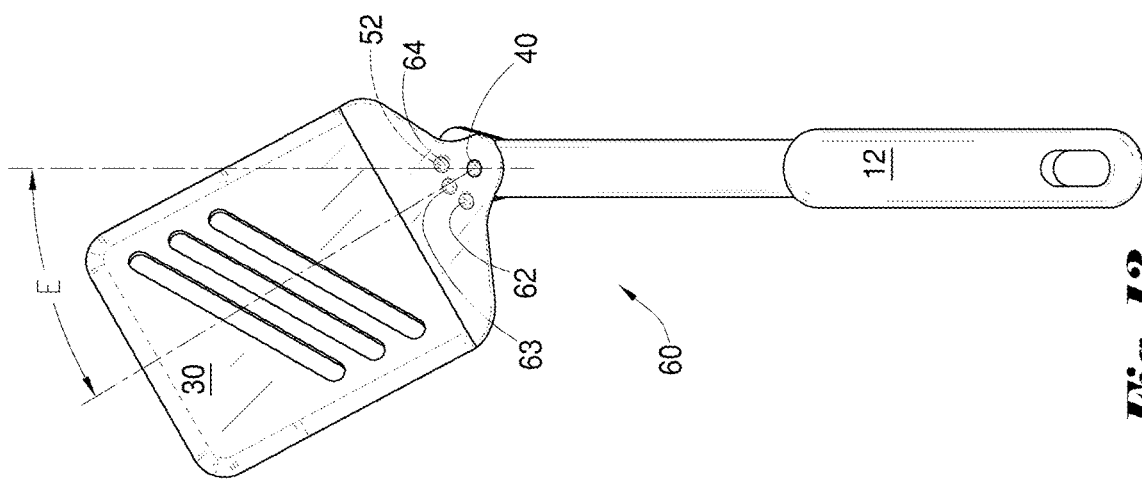
FIG. 13 is a top view of the articulating food utensil shown in FIG. 8 with the articulating blade in a third position.
Figure 12:
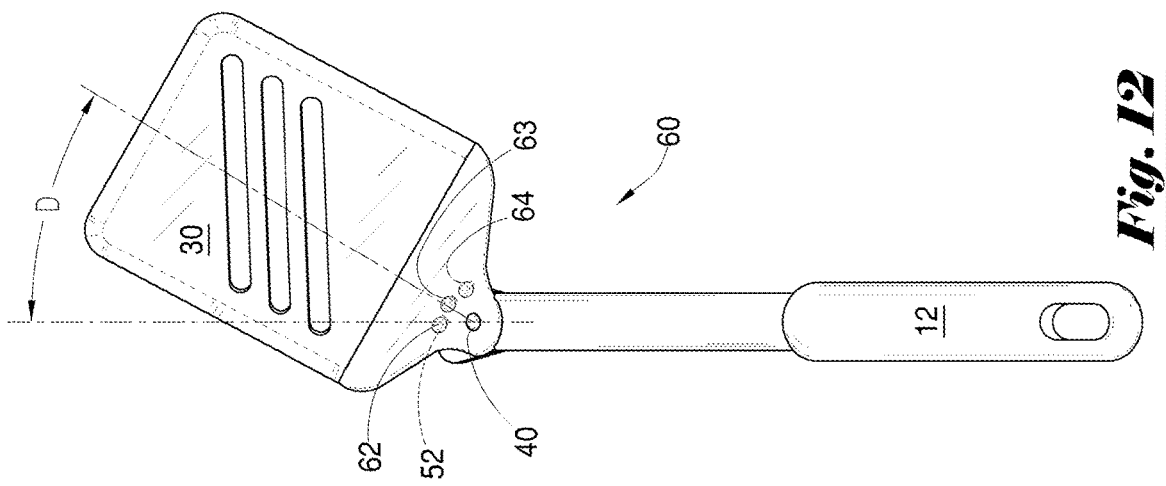
FIG. 12 is a top view of the articulating food utensil shown in FIG. 8 with the articulating blade in a second position.
Figure 11:
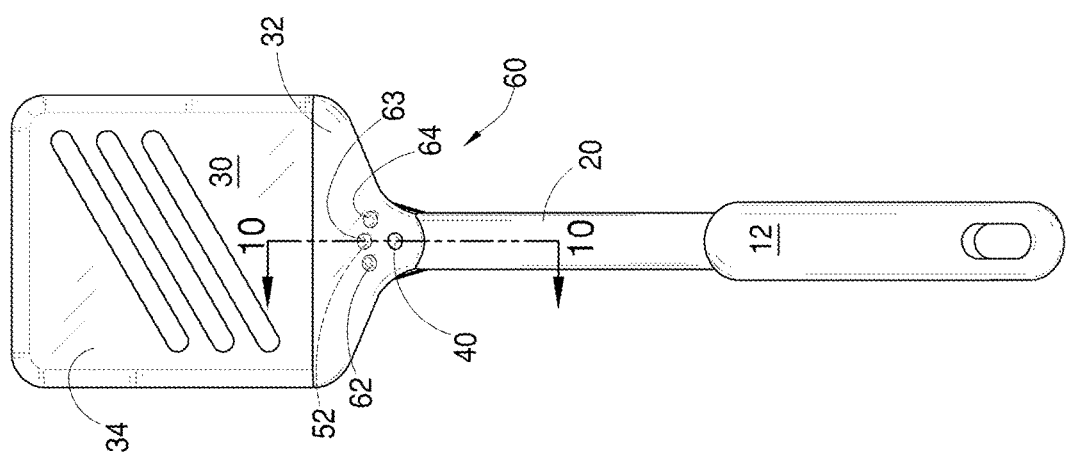
FIG. 11 is a top view of the articulating food utensil shown in FIG. 8 with the articulating blade in a first position.

FIGS. 11-13 illustrate the selective adjustment of the rotational position of articulating blade 30 of articulating food utensil 60 relative to handle 12. This adjustment process may include disengaging lock protuberance 52 from a first lock receptacle 62-64, rotating articulating blade 30 relative to handle 12 about pivot axle 40, and engaging a second lock receptacle 62-64 with lock protuberance 52 to secure articulating blade 30 in the new position.

To adjust articulating blade 30 from the first position shown in FIG. 11 to the second position shown in FIG. 12, lock protuberance 52 may be disengaged from the first lock receptacle 63 by applying an upward force on distal portion 34 or proximal portion 32 of articulating blade 30 to further separate articulating blade 30 from shaft 20. Specifically, proximal portion 32 of articulating blade 30 may be lifted to discontinue contact between top 53 of lock protuberance 52 and lock receptacle 63. In some embodiments, this step may include proximal portion 32 to separate top 53 of lock protuberance 52 from lower surface 38 of articulating blade 30. In this way, articulating blade 30 is allowed to rotate about pivot axle 40 into the second position shown in FIG. 12 in which lock protuberance 52 is aligned with lock receptacle 62. The upward force may then be removed from articulating blade 30 in order to engage lock receptacle 62 with top 53 of lock protuberance 52. In this way, the lock assembly of articulating food utensil 60 may selectively secure articulating blade 30 in the second position shown in FIG. 12, in which articulating blade 30 is rotated by angle D to the right of the axis formed by handle 12.

Similarly, articulating blade 30 of articulating food utensil 60 may be placed into the third position shown in FIG. 13 by applying an upward force on articulating blade 30 to disengage top 53 of lock protuberance 52 from lock receptacle 62. Articulating blade 30 may then be rotated into the third position shown in FIG. 13 in which lock protuberance 52 is aligned with lock receptacle 64. The upward force may then be removed from articulating blade 30 in order to engage lock receptacle 64 with top 53 of lock protuberance 52. In this way, the lock assembly of articulating food utensil 60 may selectively secure articulating blade 30 in the third position shown in FIG. 13, in which articulating blade 30 is rotated by angle E to the left of the axis formed by handle 12.

Articulating food utensils 10 and 60 may be used to lift or flip food items that are positioned on a flat or generally flat surface. Articulating blade 30 may be configured such that the weight of food items on distal portion 34 does not disengage the lock assembly. Additionally, articulating blade 30 may be configured such that the standard or typical force applied to distal portion 34 of articulating blade 30 in the lifting or flipping process does not disengage the lock assembly. In other words, the upward force required to lift articulating blade 30 above top 53 of lock protuberance 52 is greater than the typical force applied to distal portion 34 in the cooking process. In this way, the use of articulating food utensils 10 and 60 does not disengage the lock assembly in each utensil, thereby ensuring that the rotational position of articulating blade 30 relative to handle 12 is maintained during use.

Figure 14:
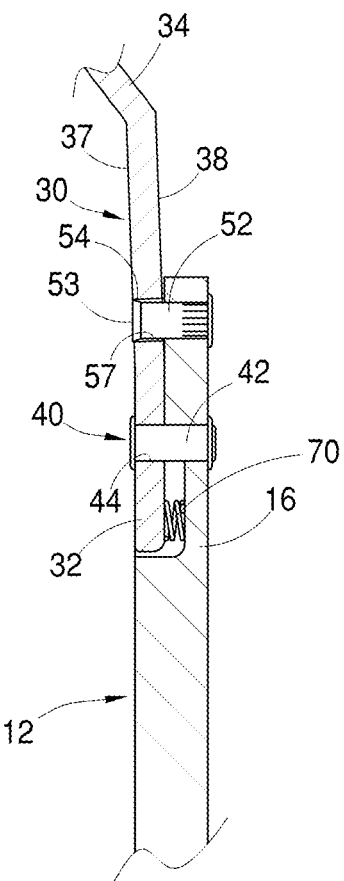
FIG. 14 is an alternative cross-sectional view of the articulating food utensil shown in FIG. 1, taken along line 4-4 in FIG. 5.
Figure 15:
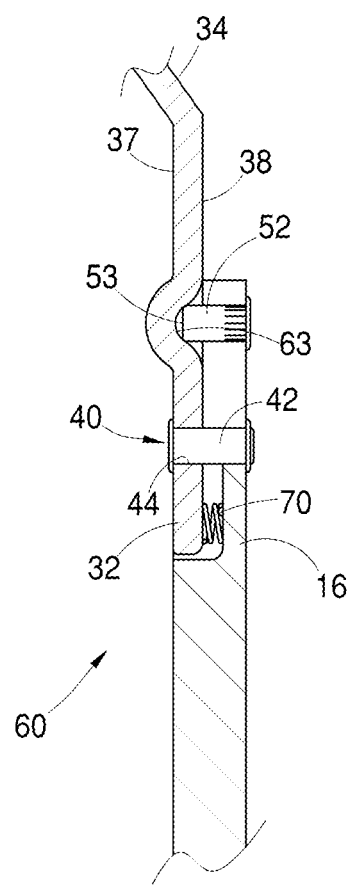
FIG. 15 is an alternative cross-sectional view of the articulating food utensil shown in FIG. 8, taken along line 10-10 in FIG. 11.

In one embodiment, articulating blade 30 is biased toward the distal end of the handle 12 to maintain the rotational position of articulating blade 30 relative to handle 12 and/or to maintain the engagement of lock protuberance 52 with the lock receptacles during use of the articulating food utensil. FIGS. 14 and 15 illustrate two such embodiments in which the bias may be created by a spring 70, such as a metallic spring secured to handle 12 with a fastener.

The various rotational positions of articulating blade 30 creates angles ranging from 0 to 360 degrees (or 0 to 180 degrees in two directions) for ease of use in turning food, such as in the cooking process involving a skillet, griddle, grill, or any other heated flat surface. Traditional food turners are fixed with the blade in-line with the handle, which requires the user to make more physical body adjustments in the flipping or turning process. The articulating food utensil disclosed herein provides for a more ergonomically correct use in the repetitive food turning or flipping process as compared to traditional food turners.

Except as otherwise described or illustrated, each of the components in this device may be formed of aluminum, steel, another metal, plastic, or any other durable, natural or synthetic material. Each device described in this disclosure may include any combination of the described components, features, and/or functions of each of the individual device embodiments. Each method described in this disclosure may include any combination of the described steps in any order, including the absence of certain described steps and combinations of steps used in separate embodiments. Any range of numeric values disclosed herein includes any subrange therein. Plurality means two or more.

While preferred embodiments have been described, it is to be understood that the embodiments are illustrative only and that the scope of the invention is to be defined solely by the appended claims when accorded a full range of equivalents, many variations and modifications naturally occurring to those skilled in the art from a review hereof.

I claim:

1. An articulating food utensil, comprising:
   a handle;
   an articulating blade secured to a distal portion of the handle, wherein the articulating blade is configured to pivot about a pivot axle relative to the handle, wherein the articulating blade includes two or more lock receptacles each comprising a hole through a proximal portion of the articulating blade; and
   a lock protuberance disposed on the distal portion of the handle, the lock protuberance including a flared profile configured to engage one of the lock receptacles for selectively retaining a rotational position of the articulating blade relative to the handle;
   wherein the articulating blade is configured to remain secured to the distal portion of the handle during rotation of the articulating blade relative to the handle; and wherein the lock protuberance is configured to remain disposed on the distal portion of the handle during rotation of the articulating blade relative to the handle.

2. The articulating food utensil of claim 1, wherein the articulating blade is configured to rotate up to 180 degrees in both directions relative to an axis formed by the handle.

3. The articulating food utensil of claim 1, wherein the pivot axle is defined by a pivot pin disposed through a pivot receptacle in the proximal portion of the articulating blade, wherein the pivot pin is secured to the distal portion of the handle.

4. The articulating food utensil of claim 3, wherein the handle comprises a holding portion and a shaft, and wherein the pivot pin and the lock protuberance are secured to the shaft.

5. The articulating food utensil of claim 4, wherein the holding portion and the shaft are formed of wood, plastic, rubber, nylon, metal, or any combination thereof.

6. The articulating food utensil of claim 3, wherein the pivot pin is formed of a pin, a post, a rivet, a screw, or a bolt.

7. The articulating food utensil of claim 3, wherein the lock protuberance is positioned beyond the pivot pin on the handle.

8. The articulating food utensil of claim 1, wherein the articulating blade is biased toward the distal portion of the handle to maintain the rotational position of the articulating blade and to maintain the engagement of the lock protuberance with one of the lock receptacles.

9. The articulating food utensil of claim 8, further comprising a spring configured to bias the articulating blade toward the distal portion of the handle.

10. The articulating food utensil of claim 1, wherein the articulating blade includes 2 to 20 lock receptacles.

11. The articulating food utensil of claim 1, wherein the articulating blade is formed of metal, nylon, wood, plastic, rubber, or any combination thereof.

12. The articulating food utensil of claim 1, wherein the articulating blade includes a distal portion having a surface that extends at an angle from the proximal portion.

13. The articulating food utensil of claim 12, wherein the distal portion of articulating blade extends from the proximal portion of articulating blade at an angle between 0 degrees and 90 degrees.

14. The articulating food utensil of claim 1, wherein the articulating blade has a flat rectangular shape.

15. The articulating food utensil of claim 14, wherein a distal portion of the articulating blade has chamfered edges.

16. An articulating food utensil, comprising:
a handle;
an articulating blade secured to a distal portion of the handle, wherein the articulating blade is configured to pivot about a pivot axle relative to the handle, wherein the articulating blade includes two or more lock receptacles each comprising a concavity in a lower surface of a proximal portion of the articulating blade; and
a lock protuberance disposed on the distal portion of the handle, the lock protuberance configured to engage one of the lock receptacles for selectively retaining a rotational position of the articulating blade relative to the handle;
wherein the articulating blade is configured to remain secured to the distal portion of the handle during rotation of the articulating blade relative to the handle; and wherein the lock protuberance is configured to remain disposed on the distal portion of the handle during rotation of the articulating blade relative to the handle.

17. The articulating food utensil of claim 16, wherein the articulating blade is biased toward the distal portion of the handle to maintain the rotational position of the articulating blade and to maintain the engagement of the lock protuberance with one of the lock receptacles.

18. The articulating food utensil of claim 17, wherein the pivot axle is defined by a pivot pin disposed through a pivot receptacle in the proximal portion of the articulating blade, wherein the pivot pin is secured to the distal portion of the handle.

19. The articulating food utensil of claim 17, further comprising a spring configured to bias the articulating blade toward the distal portion of the handle.

\* \* \* \* \*